United States Patent
Kim

(10) Patent No.: US 7,027,802 B2
(45) Date of Patent: Apr. 11, 2006

(54) METHOD OF DISPLAYING ADVERTISEMENT ON DISPLAY OF MOBILE COMMUNICATION TERMINAL

(75) Inventor: Moon-Young Kim, Kyungki-do (KR)

(73) Assignee: Alticast, Corp., Seoul (KR)

(*) Notice: Subject to any disclaimer, the term of this patent is extended or adjusted under 35 U.S.C. 154(b) by 354 days.

(21) Appl. No.: 10/015,054

(22) Filed: Dec. 11, 2001

(65) Prior Publication Data

US 2002/0072353 A1 Jun. 13, 2002

(30) Foreign Application Priority Data

Dec. 13, 2000 (KR) ............... 2000-76138

(51) Int. Cl.
*H04B 1/38* (2006.01)
*H04M 1/00* (2006.01)

(52) U.S. Cl. ............... 455/414.1; 455/466; 455/566; 379/93.19; 379/93.29; 379/201.01

(58) Field of Classification Search .. 379/93.12–93.17, 379/93.19, 93.23, 93.24, 93.25, 110.01, 201.01, 379/201.02, 201.04, 201.05, 207.02, 207.03; 455/403, 412.1, 412.2, 414.1, 414.3, 414.4, 455/466, 550.1, 566; 340/825.27; 705/14

See application file for complete search history.

(56) References Cited

U.S. PATENT DOCUMENTS

| | | | | |
|---|---|---|---|---|
| 6,084,583 A | * | 7/2000 | Gerszberg et al. | 345/867 |
| 6,141,010 A | * | 10/2000 | Hoyle | 345/854 |
| 6,298,218 B1 | * | 10/2001 | Lowe et al. | 455/66.1 |
| 6,665,533 B1 | * | 12/2003 | Sakoda | 455/414.2 |
| 2002/0009978 A1 | * | 1/2002 | Dukach et al. | 455/99 |
| 2002/0049049 A1 | * | 4/2002 | Sandahl et al. | 455/414 |
| 2002/0095340 A1 | * | 7/2002 | Vermande | 705/14 |
| 2002/0166127 A1 | * | 11/2002 | Hamano et al. | 725/105 |
| 2003/0181201 A1 | * | 9/2003 | Bomze et al. | 455/414.3 |

FOREIGN PATENT DOCUMENTS

WO WO 99/55066 * 10/1999

* cited by examiner

*Primary Examiner*—Ovidio Escalante
*Assistant Examiner*—Samir Karovalia
(74) *Attorney, Agent, or Firm*—Hamre, Schumann, Mueller & Larson, P.C.

(57) ABSTRACT

A method of displaying an advertisement on a display of a mobile communication terminal is provided. According to the method of displaying the advertisement, advertisement data is received through a wireless Internet network. The received advertisement data is compared with advertisement data stored in a storage device of a mobile communication terminal, to thus update the received advertisement data. It is determined whether the mobile communication terminal is activated and advertisement data to be displayed on a display of the mobile communication terminal is selected from the storage device according to the determination result. The selected advertisement data is displayed on the display of the mobile communication terminal.

2 Claims, 3 Drawing Sheets

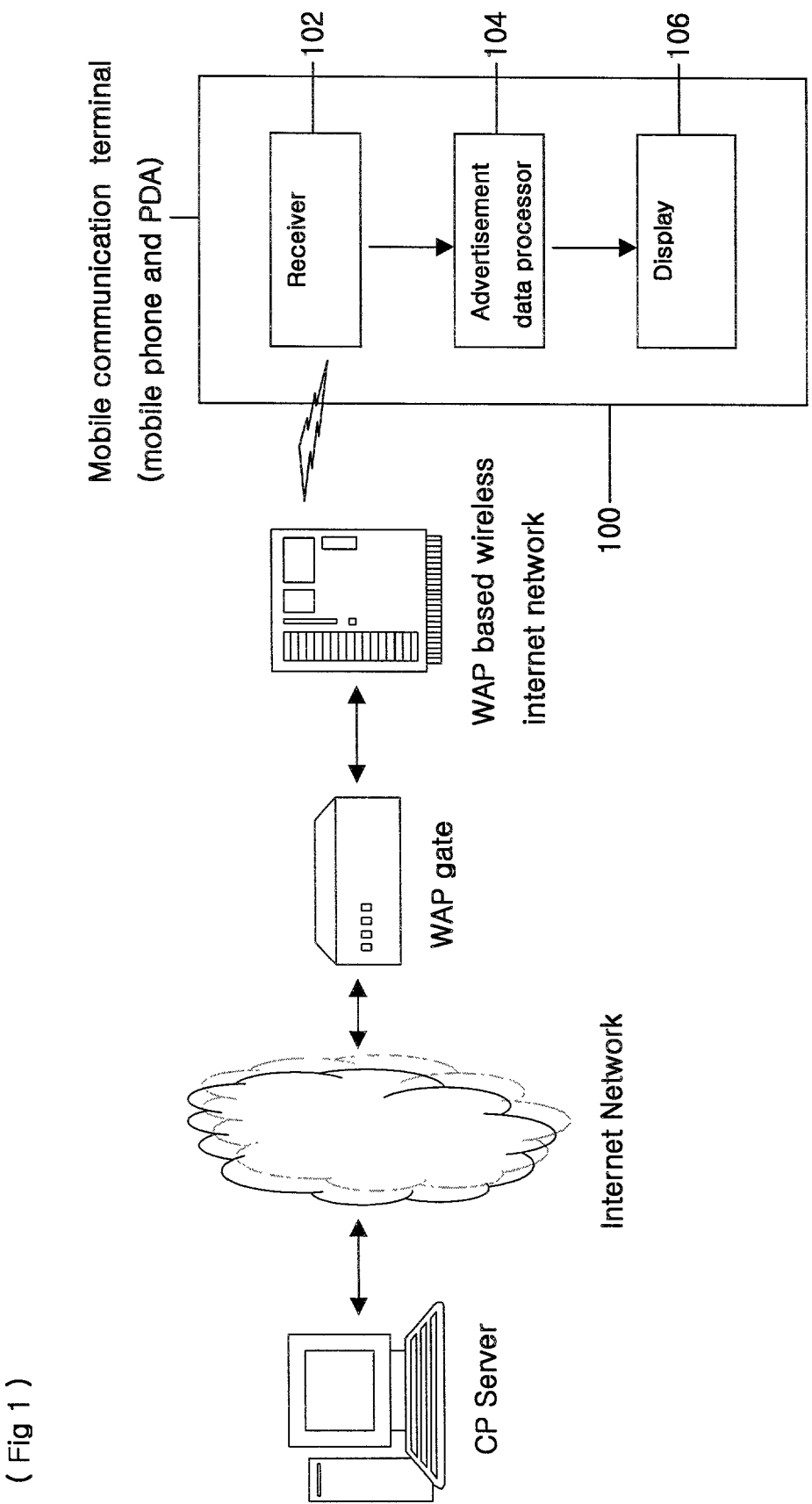
(Fig 1)

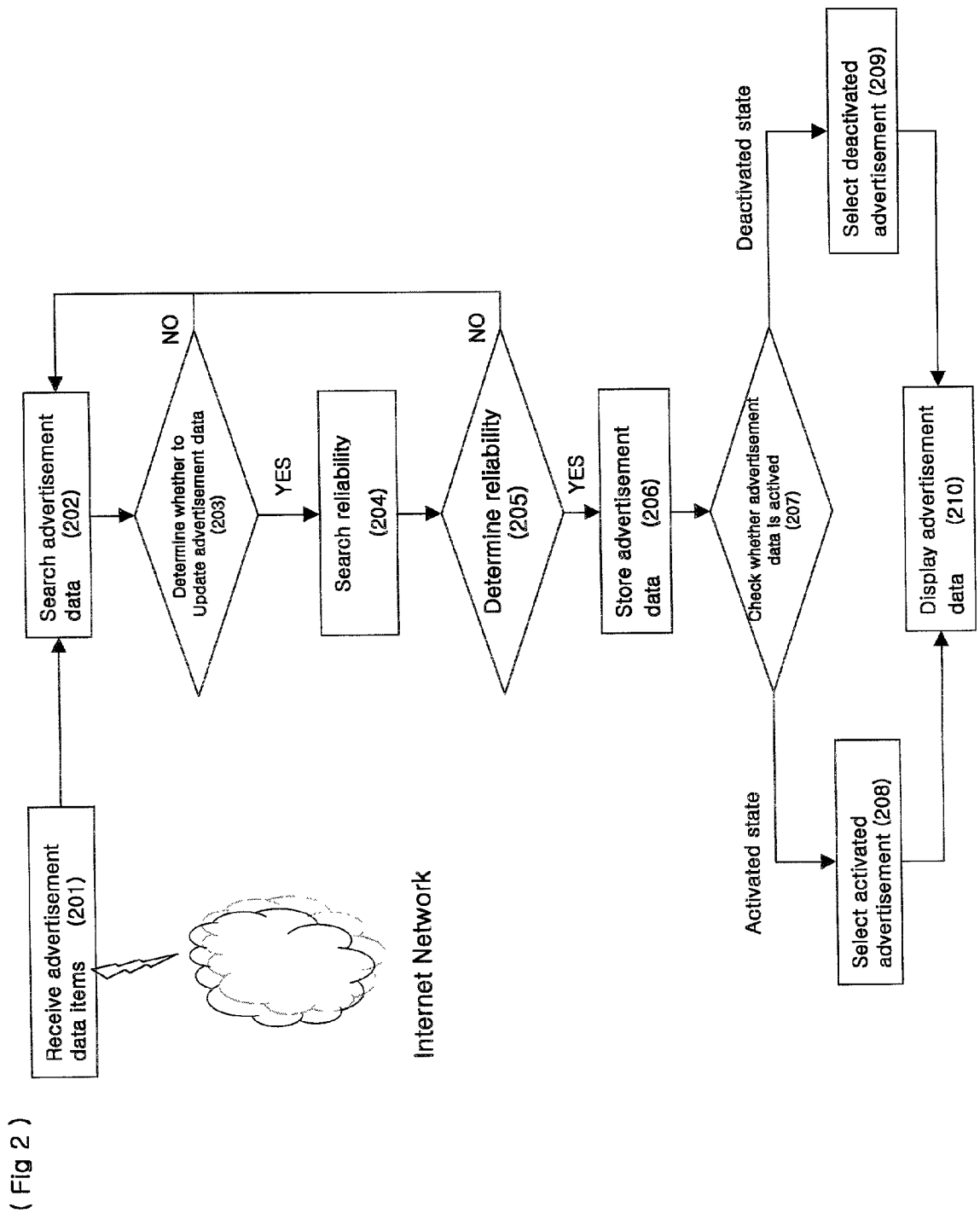
(Fig 2)

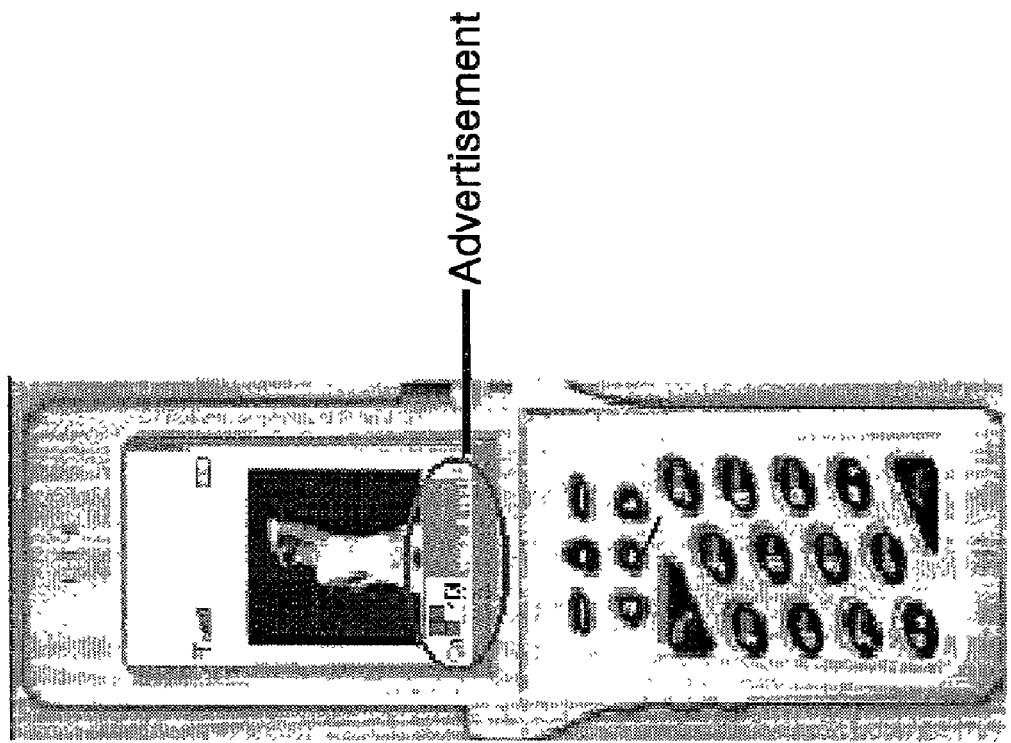
(Fig 3)

METHOD OF DISPLAYING ADVERTISEMENT ON DISPLAY OF MOBILE COMMUNICATION TERMINAL

BACKGROUND OF THE INVENTION

1. Field of the Invention

The present invention relates to a method for displaying advertisements on a display of a mobile communication terminal.

2. Prior Art

In advertising method using wire communication means, there exists a service of discounting the fee for telephone calls when a user listens to the contents of advertisements through a telephone. However, since users hardly listen to the contents of the advertisements on purpose and calling procedures for using the service are complicated, the service is rarely used.

Also, in an advertising method using wireless communication means, a method of receiving the advertisement contents such as Short Message Service (SMS) and displaying the advertisement contents on a display of a wireless mobile communication terminal such as a mobile phone has been developed. However, according to the conventional advertising method using the wireless communication means, there is only one chance of using bandwidth in order to display single advertisement content. Therefore, the contents of the advertisements cannot be displayed on the display of the wireless mobile communication terminal of a user when the user makes a phone call by the mobile phone or uses the Internet service based on a wireless Internet protocol such as Wireless Application Protocol (WAP).

SUMMARY OF THE INVENTION

Therefore, the present invention has been made to overcome the problems set forth above, and the object thereof is to provide a method of sequentially displaying advertisements on a display of a wireless mobile communication terminal of a user regardless of whether the user makes a telephone call or contacts the Internet.

To achieve the object of the present invention, there is provided a method of displaying an advertisement on a mobile communication terminal, comprising the steps of receiving advertisement data through a wireless Internet network, comparing the received advertisement data with advertisement data stored in a storage device of a mobile communication terminal, to thus update the received advertisement data, determining whether the mobile communication terminal is activated and selecting advertisement data to be displayed on a display of the mobile communication terminal from the storage device according to the determination result, and displaying the selected advertisement data on the display of the mobile communication terminal.

BRIEF DESCRIPTION OF THE DRAWINGS

The above objects and features of this invention will become more apparent through detailed descriptions of the preferred embodiments and with reference to the drawings annexed hereto.

FIG. 1 is a schematic view explaining an advertising method according to the present invention;

FIG. 2 is a flow chart illustrating an advertising method according to the present invention; and FIG. 3 is a view showing an example of displaying an advertisement on a display of a mobile communication terminal according to the advertising method of the present invention.

DESCRIPTION OF THE PREFERRED EMBODIMENTS

The above objects, features and advantages of the present invention are described in greater detail hereinafter through the preferred embodiments depicted in the annexed drawings.

FIG. 1 is a schematic view explaining an advertising method according to the present invention. According to the present invention, a wireless Internet network using well-known WAP and a wireless Internet network based on a TCP/IP protocol are used as a wireless Internet network for transmitting advertisement data to be displayed on a display of a mobile communication terminal. The transmission of the advertisement data through the wireless Internet network based on WAP is described in FIG. 1. However, various modifications of a method of transmitting a wireless Internet network to the outside of the mobile communication terminal exist in the present invention.

Advertisement contents are text formatted using a wireless markup language (WML), which is developed for coding for transmission of data in the wireless Internet network based on the WAP, by a contents provider (CP) server for generating various advertisement data items and information data items to be provided to a wireless mobile communication terminal 100. The text formatted advertisement contents are transmitted to a WAP gate through an Internet network using a TCP/IP protocol. The WAP gate is a core portion for converting the format of text based data into a format suitable for a transmission network to be transmitted to the mobile communication terminal. The advertisement contents transmitted by the WAP gate are converted into 2-bit binary data and is transmitted to the mobile communication terminal 100 of the user through the transmission network.

A circuit switched data (CSD) method, a packet switched data (PSD) method, and a short message service (SMS) method can be used for the transmission network.

The advertisement data transmitted as mentioned above is received by a receiver 102 of the mobile communication terminal 100 of the user and is displayed on a display 106. A mobile phone supporting a WAP protocol or a personal digital assistant (PDA) can be applied to the mobile communication terminal 100. A browser supporting a function for browsing the WAP based advertisement data on the display 106 is provided to the mobile communication terminal 100. The advertisement data is displayed on the display 106 of the mobile communication terminal 100 of the user by the browser. As shown in FIG. 1, the advertisement data is processed by an advertisement data processor 104 of the mobile communication terminal 100. The advertisement data processor 104 is realized as software using JAVA or the WML, to thus be installed in the mobile communication terminal 100, or is realized as hardware having a function of displaying advertisements, to thus be built-in the mobile communication terminal 100.

FIG. 2 is a flow chart illustrating a method of displaying advertisements on a display of a mobile communication terminal according to a preferred embodiment of the present invention. The advertising method according to the present invention is performed by the following steps.

1. The Step of Receiving the Advertisement Data (201)

The receiver 102 receives the advertisement data from the wireless Internet network. Since the receiver 102 and the method of receiving the advertisement data are well-known to those skilled in the art, detailed description thereof will be omitted.

2. The Step of Updating the Advertisement Data

In the advertisement data, he contents of the advertisements are updated by the CP server according to the request of advertisers or advertisement policies. In the step of updating the advertisement data, the version and the priority of the received advertisement data are searched and are stored in a storage device.

The step of updating the advertisement data includes the steps of searching the advertisement data (202), determining whether to update the advertisement data (203), searching the reliability of the advertisement data (204), determining the reliability of the advertisement data according to the searched reliability of the advertisement data (205), and storing the advertisement data whose reliability is approved (206).

In the step of searching the advertisement data (202), data such as the version and the priority of the advertisement data and an advertisement type according to the activation state of the mobile communication terminal 100 are searched while monitoring the received advertisement data. Since the advertisement data is formatted by a predetermined method when the advertisement data is transmitted from the CP server, a well-known method can be used for interpreting the information of the data in the receiving step (201).

In the step of determining whether to update the advertisement data (203), whether to update the advertisement data is determined according to the version or the priority of the advertisement data searched and interpreted in the step of searching the advertisement data (202). When advertisement data is determined to be updated according to the version and priority of the advertisement data stored in the storage device that will be mentioned later, the reliability of the advertisement data is searched by performed the reliability searching step 204. When the advertisement data is determined not to be updated as a search result of the reliability searching step (204), the advertisement data searching step 202 is performed again, to thus monitor the advertisement data received in the step of receiving the advertisement data (201).

In the reliability searching step 204, it is searched whether the owner of the advertisement data received using a data security and authentication method coincides with the advertiser registered in the CP server Whether the advertisement data is reliable is determined according to the search result in the reliability determining step 205. When the advertisement data is determined to be reliable in the reliability determining step 205, the advertisement data is stored in the storage device in the storing step 206. The storage device is formed of a storage element, from which data can be read and on which data can be written, such as a flash memory.

Advertisements displayed when the mobile communication terminal is activated and advertisements displayed when the mobile communication terminal is deactivated are separately stored in the storage device according to the advertisement type based on the activation state of the terminal, which is searched in the step of searching the advertisement data (202).

3. The Step of Determining Whether the Mobile Communication Terminal is Activated and Selecting the Advertisement Data According to the present invention, the same advertisement can be always displayed. Another advertisement can be displayed according to the activation state of the mobile communication terminal 100. In the step of determining whether the mobile communication terminal is activated, it is determined whether the mobile communication terminal 100 is activated and the advertisement data is selected according to whether the mobile communication terminal 100 is activated. In order to select the advertisement data according to the activation state of the mobile communication terminal 100, advertisement display information according to the activation state of the mobile communication terminal is inserted into the advertisement data transmitted from the server and the information is interpreted in the step of receiving the advertisement data 201.

In the step of checking whether the mobile communication terminal is activated (207), it is checked whether a telephone call can be made or data can be transmitted and received by the mobile communication terminal 100. The activation state can be defined by criteria such as whether the flip (or the folder) of the mobile communication terminal 100 is opened, whether a telephone call is made, and whether information can be transmitted and received. The activation state checking step (207) can be performed by the component of the mobile communication terminal 100, which can check the activation state of the mobile communication terminal 100.

When it is determined in the activation state checking step (207) that the mobile communication terminal 100 is activated, the activated advertisement data stored in the storage device is selected in the activated advertisement selection step 208. When it is determined that the mobile communication terminal 100 is deactivated, the deactivated advertisement data is selected in the deactivated advertisement selection step (209).

4. The Step of Displaying the Advertisement Data (210)

In general, the software (the browser) for displaying the contents data received from the CP server on the display 106 is installed in the mobile communication terminal 100 for receiving various contents data items from the wireless Internet network. The WML based browsers are used in the WAP based wireless Internet network. In the wireless Internet network using the TCP/IP protocol and the wireless Internet network of another method, browsers corresponding thereto are used. The advertisement data selected according to the activation state is displayed on the display 106 by the browser.

FIG. 3 is a view showing an example of displaying an advertisement on the display 106 of the mobile communication terminal 100 according to the advertising method of the present invention. As shown in FIG. 3, the advertisement data occupies some part of the display 106 of the mobile communication terminal 100 and is continuously displayed on the display 106. The advertisement can be changed according to the activation state.

As mentioned above, since the advertisement data stored in the storage device is displayed on the display of the mobile communication terminal, it is possible to always provide the advertisement contents to the users regardless of whether the mobile communication terminal is used.

Also, the advertisement data stored in the storage device is displayed on the display, it is possible to transmit the advertisement contents to the users regardless of the load or traffic jam of the wireless Internet network.

Since the contents of the advertisements are displayed without manipulation of the users who use the mobile communication terminal, it is possible to increase the exposure time and the concentration degree of the advertisements.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A method of displaying an advertisement on a mobile communication terminal, comprising the steps of:
   (a) receiving advertisement data through a wireless Internet network;
   (b) comparing the received advertisement data with advertisement data stored in a storage device of a mobile communication terminal, to thus update the received advertisement data; said comparing step comprising, searching the version and the priority of the received advertisement data, determining whether the stored advertisement data is to be undated according to the information of the searched advertisement data, searching the reliability of the stored advertisement data determined to be updated, determining the reliability of the advertisement data whose reliability is searched, and storing the advertisement data whose reliability is determined in the storage device;
   (c) determining whether the mobile communication terminal is activated and selecting advertisement data to be displayed on a display of the mobile communication terminal from the storage device according to the determination result; and
   (d) displaying the selected advertisement data on the display of the mobile communication terminal.

2. The method as claimed in claim 1, wherein the step (c) comprises the steps of:
   determining whether the mobile communication terminal is activated;
   selecting activated advertisement date stored in the storage device for when the mobile communication terminal is activated; and
   selecting deactivated advertisement data stored in the storage device for when the mobile communication terminal is deactivated.

* * * * *